3,090,809
PRODUCTION OF BORIC ACID AMIDES
Konrad Lang and Friedrich Schubert, Leverkusen, Germany, assignors to Farbenfabriken Bayer Aktiengesellschaft, Leverkusen, Germany, a corporation of Germany
No Drawing. Filed June 23, 1960, Ser. No. 38,393
Claims priority, application Germany June 27, 1959
11 Claims. (Cl. 260—551)

Boric acid trisamides of the general formula $B(NR_2)_3$ or $B(NHR)_3$ wherein R is a hydrocarbon radical are technically important products serving for example as fuel additives or stabilizers for synthetic resins.

Their production is only possible by difficult and expensive methods. Thus for example boric amides may be produced by the reaction of boron trichloride with aliphatic or aromatic amines. The amines are reacted in great excess over the boron trichloride. The isolation of the pure boric acid amide is very difficult and gives only low yields [J. Org. Chem. 8, 526, (1943)].

$$BCl_3 + 6R_2NH \rightarrow B(NR_2)_3 + 3[R_2NH_2]Cl$$

It is further known to dissolve the compound $$C_2H_5NH_2BF_3$$

in liquid ethylamine and to react with metallic lithium, whereby the readily volatile compound $B(NHC_2H_5)_3$ results;

$$C_2H_5NH_2 \cdot BF_3 + 2C_2H_5NH_2 + 3Li$$
$$\rightarrow B(NHC_2H_5)_3 + 3LiF + 3H_2$$

The process according to this description requires very complicated and bulky apparatus (J. Am. Chem. Soc. 52 (1953), 4414). A new process (Zeitschr. Anorg. Allg. Chem. 294 (1959), 81–91), describes the production of boric acid amides by reacting boron halides with the reaction products of primary or secondary amines with Grignard compounds or alkali metals.

$(a_1)$ $3(CH_3)_2NH + 3C_2H_5MgBr$
$\rightarrow 3(CH_3)_2N \cdot MgBr + 3C_2H_6$
$(a_2)$ $3(CH_3)_2N \cdot MgBr + BF_3 \cdot O(CH_3)_2$
$\rightarrow B[N(CH_3)_2]_3 + 3MgBrF + (CH_3)_2O$
$(a_3)$ $\overline{3(CH_3)_2NH + 3C_2H_5MgBr + BF_3 \cdot O(CH_3)_2}$
$\rightarrow B[N(CH_3)_2]_3 + 3C_2H_6 + 3MgBrF + (CH_3)_2O$
$(b_1)$ $3C_6H_5(CH_3)NH + 3K \rightarrow 3C_6H_5(CH_3)NK + \tfrac{3}{2}H_2$
$(b_2)$ $3C_6H_5(CH_3)NK + BF_3 \cdot O(CH_3)_2$
$\rightarrow B_1N(CH_3)C_6H_5]_3 + 3KF + (CH_3)_2O$
$(b_3)$ $\overline{3C_6H_5(CH_3)NH + 3K + BF_3 \cdot O(CH_3)_2}$
$\rightarrow B[N(CH_3)C_6H_5]_3 + 3KF + \tfrac{3}{2}H_2 + (CH_3)_2O$ Grignard compounds are indeed readily obtainable but expensive bodies which moreover can only be brought to reaction, because of their exception reactivity, under special precautionary measures and only in certain solvents—in this process dried with metallic potassium. The procedure with metallic potassium which is known to be significantly more reactive than metallic sodium, involves even more severe precautionary measures.

The known production of the compounds $$HB[N(NH_3)_2]_2$$

from $H_2BN(CH_3)_2$ and dimethyl amine is likewise very complicated since the starting material $H_2B=N(CH_3)_2$ can be produced on a bigger scale only by introducing diborane at —42° C. into liquid dimethylamine, pumping off excess amine and heating the residue to 130° C. under 400 mm. nitrogen pressure. Diborane is however a very poisonous gas and involves very cumbersome protective means (Gmelins, Handb. d. Anorg. Chemie, System No. 13, Ergängungsband, S. 239/241).

The same applies to the known reaction of secondary amines with trialkyl amine boranes which latter are produced from poisonous diborane and trialkylamine or by pressure hydration of the boron trialkyls, which are difficult to handle and which spontaneously ignite in the presence of air (Angewandte Chemie 69, (1957), S. 684).

The object of the present invention is a process for the production of boric acid amides of the general formula $$H_{3-n}B(NRR')_n$$

wherein $n$ is 1, 2 or 3, R is an aromatic, aliphatic or hydroaromatic radical and R' is an aromatic, aliphatic or hydroaromatic radical or hydrogen or NRR' represents a radical formed by splitting off the hydrogen attached to the nitrogen of heterocyclic nitrogen bases, characterised in that primary or secondary amines of the formula RR'NH, wherein R and R' have the above given significance, or heterocyclic nitrogen bases with N-attached hydrogen, are reacted with metal borohydrides and boron trihalides or their addition compounds with amines or ethers, the molar ratio of amine to boron trihalide being equal to at least 2:1.

It has been found that boric amides of the above defined type may be very readily produced by reacting suspensions of alkali metal or alkaline earth metal borohydrides preferably in a high boiling solvent, with amines of the aforesaid composition and boron halides, e.g. according to the equations:

$12C_6H_5NH_2 + 4BF_3 + 3NaBH_4$
$\rightarrow 4B[NHC_6H_5]_3 + 3NaBF_4 + 12H_2$
$8(C_4H_9)_2NH + 4BF_3 + 3NaBH_4$
$\rightarrow 4HB[N(C_4H_9)_2]_2 + 3NaBF_4 + 8H_2$
$12p\text{-}Cl\text{-}C_6H_4NH_2 + 4BF_3 + 3NaBH_4$
$\rightarrow 4B[NHC_6H_4Cl]_3 + 3NaBF_4 + 12H_2$
$12C_6H_5(CH_3)NH + 4BF_3 + 3NaBH_4$
$\rightarrow 4B[N(CH_3)C_6H_5]_3 + 3NaBF_4 + 12H_2$
$12C_6H_5(CH_3)NH + 4BF_3 + 3NaBH_4$
$\rightarrow 4B[N(CH_3)C_6H_5]_3 + 3NaBF_4 + 12H_2$ As amines there may be used according to the process of the invention: primary and secondary aliphatic amines such as methyl amine, dimethyl amine, diethyl amine, ethyl amine, butyl amine, propyl amine, dibutyl amine, dipropyl amine, dodecyl amine, stearyl amine, 1-dimethyl-amino-4-amino-n-pentane, ethylene diamine, N,N'-dimethyl ethylene diamine, trimethylene diamine, hexamethylene diamine; primary and secondary aromatic amines such as aniline, N-methylaniline, p-chloroaniline, o,p-dichloroaniline, o,p,m-toluidine, xylidine, p-anisidine, p-phenetidine, naphthylamine, bromnaphthylamine, p,p'-diaminodiphenyl, p,p'-diamine-diphenyl ether, p,p'-diamino-diphenyl sulphide; and heterocyclic nitrogen bases with N-attached nitrogen such as piperidine, morpholine, piperazine, aminotriazole, aminopyridine, aminoquinoline and carbazole.

As boron trihalide, boron trifluoride is principally used but boron trichloride, tribromide or triiodide can also be applied. For more ready handling of the boron halides they are preferably used in the form of their addition compounds with ethers such as dimethyl ether, diethyl ether, dioxane or tetrahydrofurane or with amines, whereby it is especially advantageous to use as ligands the amines participating in the reaction to form boric acid amides.

The use of solvents is preferred but not necessary. High boiling hydrocarbons such as xylol or mineral oil fractions boiling at 150–300° C. or synthetic hydrocarbon mixtures can serve as solvents and furthermore high boiling ethers such as diethylene glycol dialkyl ethers. It is especially advantageous to use excess of the amine participating in the reaction since in this way the equilibrium position is improved and borohydrides exhibit a certain solubility in primary and secondary amines.

Of the borohydrides, sodium borohydride is used with especial advantage because of its commercial availability but other alkali metal borohydrides e.g. $LiBH_4$ or $KBH_4$ as well as alkaline earth metal borohydrides such as $Ca(BH_4)_2$ or their addition compounds with ethers (especially with tetrahydrofurane) or amines are very suitable as starting products.

In the process according to the invention it is not necessary to use extremely purified solvents since last traces of water or alcohol etc. are removed by the reaction itself. It is advantageous to lead such solvents purified in the first batch in a cycle since the yield is advantageously influenced in this way.

According to a known process the reaction of trialkyl amine-boron fluoride adducts with borohydrides results in trialkyl amine boranes, and the reaction of ammonia-boron fluoride adducts with borohydrides leads to amine borane $NH_3 \cdot BH_3$. On the other hand the process according to the present invention proceeds surprisingly in a completely different direction.

*Example 1*

$12C_6H_5NH_2 + 4BF_3 \cdot C_4H_8O + 3NaBH_4$
$\rightarrow 4B(NHC_6H_5)_3 + 3NaBF_4 + 4C_4H_8O + 12H_2$ To a suspension of 50 grams sodium borohydride in 280 grams of aniline there are slowly added dropwise with stirring at 130–150° C., 140 grams of borontrifluoride-tetrahydrofurane. The tetrahydrofurane set free in the reaction is distilled off. Heating is continued to the end of the evolution of hydrogen, to about 150° C. After cooling and filtering off, the evaporated filtrate and filtration residue are extracted with benzene. There is obtained in almost quantitative reaction the very pure boric acid trisanilide formed. Melting point: 168° C.

*Example 2*

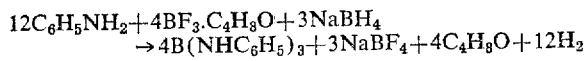

The procedure of Example 1 is followed with the modification that instead of aniline, 380 grams of molten p-chloroaniline are used, excess chloraniline is removed after the reaction by vacuum distillation and the boron tris(4-chloroanilide) obtained is purified by crystallization form toluene. Melting point 207° C., yield 91% of the theoretical.

*Example 3*

In a similar manner to Example 2, boron-tris-(3,5-dichloroanilide) is produced melting at 193° C.; formula:

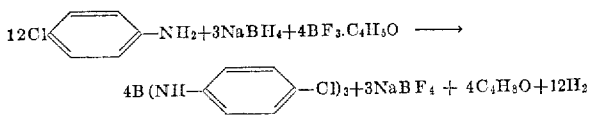

*Example 4*

Boron-tris-(methylanilide) produced in a manner similar to that of Example 2, melts at 210° C. Formula:

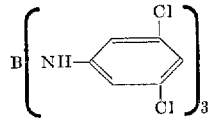

*Example 5*

$8(C_4H_9)_2NH + 4BF_3 \cdot C_4H_8O + 3NaBH_4$
$\rightarrow 4HB[N(C_4H_9)_2]_2 + 3NaBF_4 + 4C_4H_8O + 8H_2$ In 390 grams of di-n-butylamine, 23 grams of sodium borohydride are suspended. This is heated with stirring and at 110° C., 70 grams of boron trifluoride tetrahydrofuranate are added dropwise. Liberal evolution of hydrogen occurs. The temperature is now raised slowly to reflux, whereupon tetrahydrofurane is distilled off. Finally it is allowed to boil for two hours under reflux at 158° C., cooled, filtered, and the filtrate fractionated in vacuum.

After dibutylamine and a small quantity of pre-runnings, hypoboric acid-bis-dibutyl amide distills at 2 mm. pressure and 127–135° C.

*Example 6*

Hypoboric acid bis-dipropylamide $HB(N(C_3H_7)_2)_2$, produced in a manner similar to that of Example 5, boils at 78–81° C. at 1 to 2 mm. pressure.

We claim:
1. Process for the production of boric acid amides which comprises reacting at a temperature of from about 130 to 300° C. a boron halogen compound selected from the group consisting of boron trihalides, boron trihalide ether addition compounds, and boron trihalide amine addition compounds, with a mixture of (A) a metal borohydride selected from the group consisting of alkali metal borohydrides and alkaline earth metal borohydrides, and (B) an amine having the formula

RR′N—H wherein R and R′ are each a member selected from the group consisting of alkyl, aryl and alkaryl, the alkoxy, halo, dialkyl amino and amino derivatives thereof, pyridyl, quinolinyl, and hydrogen, with the proviso that only one of R and R′ can be hydrogen and where RR′N— can form a ring selected from the group consisting of piperidino, morpholino, piperazino, aminotriazolo, and carbazolo radicals, the molar ratio being at least 2 mols of said amine to one mol of said boron halogen compound, to thereby form a boron compound in which at least one of the valences of boron is connected to the nitrogen of said amine in substitution of the hydrogen atom and recovering said boron compound.

2. Process for the production of boric acid trisanilide which comprises reacting boron trifluoride tetrahydrofuranate with a mixture of sodium borohydride and aniline, said aniline being present in excess to said boron trifluoride tetrahydrofuranate, at a temperature of about 130–150° C., heating the reaction mixture till the evolution of hydrogen ceases and recovering the boric acid trisanilide thus formed.

3. Process for the production of boric acid tris(N-methylanilide) which comprises reacting boron trifluoride tetrahydrofuranate with a mixture of sodium borohydride and N-methylaniline, said N-methylaniline being present in excess to said boron trifluoride tetrahydrofuranate, at a temperature of about 130–150° C., heating the reaction mixture till the evolution of hydrogen ceases and recovering the boric acid tris(N-methylanilide) thus formed.

4. Process for the production of boric acid tris(p-chloranilide) which comprises reacting boron trifluoride tetrahydrofuranate with a mixture of sodium borohydride and p-chloro-aniline, said p-chloro-aniline being present in excess to said boron trifluoride tetrahydrofuranate, at a temperature of about 130–150° C., heating the reaction mixture till the evolution of hydrogen ceases and recovering the boric acid tris(p-chloranilide) thus formed.

5. Process for the production of boric acid tris(3,5-dichloroanilide) which comprises adding boron trifluoride tetrahydrofuranate to a mixture of sodium borohydride and 3,5-dichloroaniline, said 3,5-dichloroaniline being present in excess to said boron trifluoride tetrahydrofuranate, at a temperature of about 130–150° C., heating the reaction mixture till the evolution of hydrogen ceases and recovering the boric acid tris-(3,5-dichloroanilide) thus formed.

6. Process for the production of hypoboric acid bis-dibutylamide which comprises reacting boron trifluoride tetrahydrofuranate with a mixture of sodium borohydride and dibutylamine, said dibutylamine being present in excess to said boron trifluoride tetrahydrofuranate, at a temperature of about 110° C., re-fluxing the reaction mixture till the evolution of hydrogen ceases and recovering the hypoboric acid bisdibutylamide thus formed.

7. Process for the production of hypoboric acid bisdipropylamide which comprises reacting boron trifluoride tetrahydrofuranate with a mixture of sodium borohydride and dipropylamine, said dipropylamine being present in excess to said boron trifluoride tetrahydrofuranate, at a temperature of approximately 110° C., re-fluxing the reaction mixture till the evolution of hydrogen ceases and recovering the hypoboric acid bisdipropylamide thus formed.

8. Process according to claim 1, wherein the borohydride used is sodium borohydride.

9. Process according to claim 1, wherein the boron-halogen compound used is boron trifluoride.

10. Process according to claim 1, wherein the boron-halogen compound used is boron trifluoride-diethyl-etherate.

11. Process according to claim 1, wherein the boron-halogen compound used is boron trifluoride-tetrahydrofuranate.

References Cited in the file of this patent

FOREIGN PATENTS 1,044,822    Germany _____ Nov. 27, 1958

OTHER REFERENCES

Bergmann: The Chemistry of Acetylene and Related Compounds, page 80 (1948).

UNITED STATES PATENT OFFICE
CERTIFICATE OF CORRECTION

Patent No. 3,090,809                                             May 21, 1963

Konrad Lang et al.

It is hereby certified that error appears in the above numbered patent requiring correction and that the said Letters Patent should read as corrected below.

Column 1, line 49, for "$\rightarrow B_1 N(CH_3)C_6H_5]_3 + 3KF + (CH_3)_2O$" read -- $\rightarrow B[N(CH_3)C_6H_5]_3 + 3KF + (CH_3)_2O$ --; line 72, for "Ergängungsband" read -- Ergänzungsband --.

Signed and sealed this 21st day of January 1964.

(SEAL)
Attest:
ERNEST W. SWIDER

EDWIN L. REYNOLDS

Attesting Officer                                  Acting Commissioner of Patents